July 29, 1969        D. A. CANONICO ET AL        3,458,683
ELECTRON BEAM WELDING OF A THIN METAL FOIL
IN A SANDWICHED TYPE-ARRANGEMENT Filed Jan. 20, 1966        2 Sheets-Sheet 1

INVENTORS
Domenic A. Canonico
Edwin M. Sakaguchi
Charles A.W. Wellers

BY Charles A. Haase

United States Patent Office 3,458,683
Patented July 29, 1969

3,458,683
ELECTRON BEAM WELDING OF A THIN METAL FOIL IN A SANDWICHED TYPE ARRANGEMENT
Domenic A. Canonico, Oak Ridge, Tenn., and Edwin M. Sakaguchi, Norristown, and Charles A. W. Wellers, Devon, Pa., assignors to Atlas Chemical Industries, Inc., Wilmington, Del., a corporation of Delaware
Filed Jan. 20, 1966, Ser. No. 521,769
Int. Cl. B23k 9/00, 11/16
U.S. Cl. 219—121      3 Claims

ABSTRACT OF THE DISCLOSURE

A very thin metallic foil is positioned in a sandwiched type structure in face contact between a bottom metallic workpiece and a top metallic retaining member. The sandwiched type structure is secured together by passing an electron beam simultaneously through the top retaining member, inner metallic foil, and bottom workpiece. The inner foil member may be made of a material which is metallurgically incompatible with either the top retaining member or bottom workpiece.

---

This invention relates to a method of welding thin foil to other metal members by electron beam welding and to a method of welding metal foils to other metal members which present metallurgical incompatibility problems in the electron beam welding process.

The methods generally employed in the electron beam welding of two metal parts involve the overlapping or butting of the parts followed by directing a suitable electron beam through the metals or along the formed joint to form the weldment. In the welding of a great many metallic materials such techniques are satisfactory. However, in the welding of thin foil and in the welding of metallurgically incompatible materials such methods do not produce satisfactory results.

It is an object of this invention to provide an improved method for welding thin metal foil to another metal member.

It is another object of this invention to provide an improved method for welding foil to another metal member where the two are metallurgically incompatible.

Other objects and advantages of the present invention will become apparent upon the reading of the following description thereof.

It is conventional in the welding of metal foil to a thicker metal member to position the foil over or in contact with the metal member in the desired location and accomplish the weldment. Alternatively, it has been the practice to hold the foil in position by means of a suitable fixture or jig. Such fixtures are used to press the foil against the metal member to which it is to be joined, holding the foil as close to the point of weldment as possible, but in a manner so that the weld will not be made on or through the fixture. Using such techniques to weld foil to other thicker metal members it is generally not possible to obtain hermetically sealed weld joints because it is normally impossible to hold the foil in sufficiently intimate contact with the thicker metal member to achieve a continuous fusion weld. Whenever the foil is not in intimate contact with the metal member to which it is being welded, the electron beam will melt or otherwise vaporize the foil leaving a hole or holes in the said foil due to the differences in heat capacity of the foil and the thicker metal member to which it is to be welded. The formation of such holes results in a seal which is not gas tight.

It has been discovered that thin foil can be satisfactorily welded by electron beam welding to any suitable metal member, for example, stainless steel, carbon steel, iron or aluminum and an hermetic seal obtained if a suitable metal retaining member is placed in juxtaposition or face to face with the foil to be welded so as to force the foil into intimate contact with the metal member to which the foil is to be welded. With the use of such a retaining member, there is formed a first juncture between the said foil and the said metal member to which it is to be welded and a second juncture is formed between the said foil and said retaining member. Thereby, a weldment can be made by passing an electron beam through said two junctures. Thus, the retaining member becomes a part of the completed weldment. By use of such a retaining member it is possible to hold the foil in intimate contact with the surface to which it is to be joined and to equate differences in heating capacity between the foil and the metal member to which it is to be joined and thus prevent vaporizing or melting of the foil so as to form undesirable holes therein which would prevent the achievement of a hermetic seal after welding. Similarly, in the welding of foil to another metal member where the foil and other metal member are metallurgically incompatible, it has been found possible to weld such metals together if the retaining member is made of a suitable dilution metal which acts to sufficiently dilute the weldment between the two said metallurgically incompatible metals so as to eliminate the formation of undesirable intermetallic compounds which have undesirable characteristics.

Several preferred embodiments of the present invention are illustrated in greater detail in the accompanying drawings in which.

Figure 1:
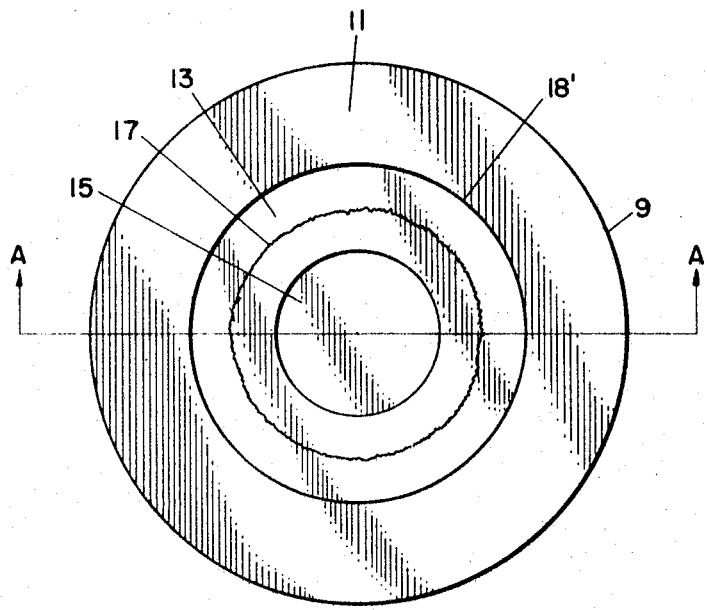
FIGURE 1 is a top view of a metal work piece welded together by a process of this invention.
Figure 2:
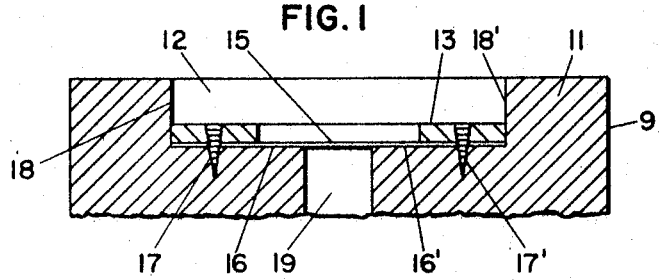
FIGURE 2 is a sectional view of the top portion of the work piece of FIGURE 1 taken along the line A—A.
Figure 3:
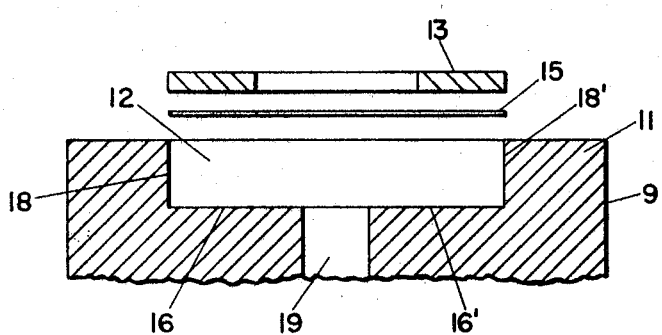
FIGURE 3 is an exploded sectional view of the work piece of FIGURE 2 before welding.

Referring now to the drawings in which like numerals are employed to designate like parts throughout FIGURES 1–3 represent work piece 9 made of a metal such as steel having a raised outer metal edge 11 and a recessed portion 12. Metallic foil 15 made of a metal such as steel is positioned in recess 12 as shown in FIGURES 1 and 2. Foil 15 is held in tight contact with the bottom surface of recess 12 designated as 16 and 16' by retaining member 13 made of a metal such as steel as shown in FIGURES 1 and 2. The diameter of retaining ring 13 is of such dimension so as to fit tightly within circular recess 12. When washer 13 as shown in FIGURE 3 is pushed into position as shown in FIGURE 2 it acts to wedge foil 15 into tight contact with surfaces 16 and 16' due to the friction between the edges of retaining member 13 and recessed walls of metal member 11 designated 18 and 18'. Foil 15 is welded over opening 19 and onto surfaces designated 16 and 16' by directing an electron beam through retaining ring 13 and foil 15 and into surfaces 16 and 16' of work piece 9. The resulting continuous weldment is designated 17 and 17' in FIGURE 2.

Figure 4:
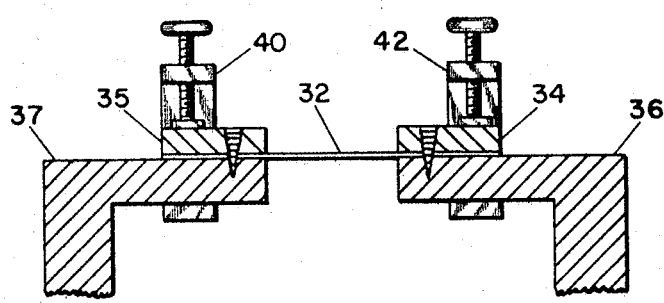
FIGURE 4 is a partial sectional view of a work piece welded together by a process of this invention.

The foil 32 and retaining members 34 and 35 shown in FIGURE 4 are held in intimate contact with metal structures 36 and 37 by means of clamps 40 and 42. After the metal structures 36 and 37 and foil 32 and retaining members 34 and 35 are clamped in a tight sandwich fashion the welding is accomplished as indicated in FIG- URE 4 by passing an electron beam through the respective sandwiched structures. Alternatively, the welding could have been accomplished by directing an electron beam to the undersides of structures 36 and 37 and welding through foil 32 and into retaining member 34 and 35 respectively.

Figure 5:
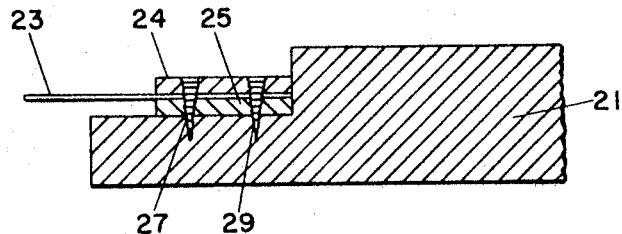
FIGURE 5 is a partial sectional view of a work piece showing the weldment of a metal foil to another metal member where the two metals are metallurgically incompatible.

FIGURE 5 illustrates a satisfactory weldment obtained between a foil 23 made of complex nickel foil and a metal structural member 21 made of 304 stainless steel which were considered metallurgically incompatible metals. By the use of the weld metal dilution method of this invention retaining members 24 and 25 made of Inconel were sandwiched on top of foil 23 and between foil 23 and metal member 21. When an electron beam is passed through retaining member 24, foil 23 and retaining member 25 and into metal member 21 a dilution of the weldments 27 and 29 with Inconel is achieved which results in a satisfactory weldment.

The metal retaining member used in the present method may be of any suitable shape and composition. Preferably, the retaining member should be dimensioned to accomplish a light interference fit between the external dimension of the said retaining member and the internal dimension of a suitable recessed member positioned around the foil to be welded. Such a recessed member may be a portion of the metal structure to which the foil is to be welded or it could be a suitable welding fixture. By the use of such a fixture or holding member the retaining member is pushed into tight contact with the foil to be welded which in turn is pushed into intimate contact with the metal member to which it is to be welded.

Alternatively, the retaining member may be of such size and weight so as to hold the foil in intimate contact at the weld joint merely because of its heaviness or other means such as clamps may be used to hold the retaining member in sandwich contact with the foil and the metal member to which it is to be welded during the welding process of the present invention.

The retaining member as used in carrying out this invention may be of any appropriate thickness through which an electron beam weldment can be accomplished and may be composed of any suitable metal, for example: steel, iron or aluminum.

The thickness of a suitable retaining member may vary greatly but will generally be within the range of from about 0.020 inch to about 1 inch. However, dependent on structural specifications and demands the thickness of the retaining member may be less or greater so long as it is thick enough to equate the differences in heat capacity between the foil and the metal member to which it is to be welded. The dimensions of the retaining member as used in the present invention should be such so as to cover the foil in the areas where the weldment is to be accomplished.

Foils made from any suitable metal may be welded according to the present method, for example, nickel, tin, copper or gold. Metallic foils suitable for use in the present method will generally be within the range of from about 0.0001 inch to about 0.030 inch thick with the majority of such foils possessing a thickness of between about 0.004 inch and 0.010 inch. However, metallic foil of any thickness may be welded according to the method of the present invention.

According to the method of this invention it is also possible to weld together metals which are metallurgically incompatible in the usual electron beam welding process by the use of a metal retaining member made from a suitable dilution metal. Such a welding method is particularly valuable in the welding of low melting foils, for example, copper or silver, which may be required for their strength or other mechanical characteristics. Quite often metal foils such as copper or silver during the process of being welded to another metal structure will act in combination with the metal of such a structure to form lower melting alloy combinations in the area of the weldment which may have undesirable characteristics. By the use of a suitable metal retaining member, to hold the foil in juxtaposition with the metal member to which it is to be joined, and by directing the electron beam through the said retaining member, foil and metal member the formation of such detrimental alloy combinations can be prevented. For example, in the welding of titanium foils to steel or other iron alloys metallic combinations are formed which prevent the achievement of a satisfactory weldment. By the use of a retaining member of a metal such as vanadium it is possible to sufficiently dilute the weld between the titanium and iron with vanadium so as to eliminate the formation of brittle, undesirable intermetallic compounds which result in the formation of a poor weldment. Further, the use of a retaining member of nickel aids in producing sound welds between phosphorous bearing copper or other alloys and nickel or iron bearing base metals. The dilution of the weld by the nickel retaining member will prevent the formation of undesirable eutectics. Alternatively, it has been found advantageous in the welding of a complex nickel alloy foil to a metal structure of 304 stainless steel to position an Inconel retaining member on top of the foil and a second Inconel member between the foil and the 304 stainless steel structure and weld through the retaining member, foil, second Inconel member and into the stainless steel structure to obtain a very satisfactory weldment.

The manner in which these and other objects of the invention are achieved will be clear from the following examples. It will be understood that these examples are for illustrative purposes only and are not limitative in defining the scope of the present invention.

EXAMPLE 1

A .0015 inch thick nickel foil disc having a diameter of 1 inch was placed in a counterbore having a depth of ½ inch and a diameter of 1⅛ inch in the top of a cylinder composed of carbon steel. The 1 inch disc was positioned over a ½ inch hole located longitudinally through the center of said cylinder. A steel retaining ring having a thickness of .125 inch and an outside diameter slightly greater than 1⅛ inches was carefully press fitted in the counterbore of the steel cylinder and into intimate contact with the nickel foil so as to press the foil in uniform contact with the bottom of the counterbore. The welding of the nickel foil to the bottom of the counterbore in the steel cylinder was accomplished by directing an electron beam from a Hamilton Standard 6 kv. High Voltage Electron Beam Welding Apparatus (manufactured by the Hamilton Standard Division of United Aircraft Corp.) through the steel retaining ring and foil and into the carbon steel cylinder wall so as to form a continuous circular weldment between the retaining member, foil and carbon steel cylinder. The weld produced a hermetically sealed joint.

EXAMPLE 2

A .0010 inch thick phosphorous bearing copper foil rectangular strip approximately 2 inches wide by 4 inches long is placed against a 304 stainless steel flat member and held in place with a 2 by 2 inch nickel retaining member having a thickness of ¼ inch by the use of a screw clamp. An electron beam from a Hamilton Standard 6 kv. High Voltage Electron Beam Welding Apparatus is directed through the retaining member, foil and into the 304 stainless steel member to obtain a strong continuous weldment between the retaining member, foil and 304 stainless steel member.

What we claim is:

1. A method of welding to form a sandwiched structure which comprises, placing a metallic foil having a thickness of about 0.0001 inch to about 0.030 inch in face contact with a workpiece; placing a retaining metallic member having a thickness of about 0.020 inch to about 1 inch and having an area sufficient to cover said metallic foil in face contact therewith over an area where welding is to be accomplished; passing an electron welding beam through said retaining metallic member and said metallic foil and into said workpiece to weld the retaining metallic member to the metallic foil and the work piece such to form a sandwiched structure.

2. The method of claim 1 wherein said metallic foil has a thickness of about 0.004 inch to 0.010 inch.

3. The method of claim 1 wherein the metallic foil is formed of a metal metallurgically incompatible for bonding by electron beam welding to said workpiece.

References Cited

UNITED STATES PATENTS

| 2,463,414 | 3/1949 | Nelson | 73—408 |
| 2,932,720 | 4/1960 | Stohr | 219—121 |
| 2,987,610 | 6/1961 | Steigerwald | 219—121 |
| 3,020,987 | 2/1962 | Schaurte | 219—118 |
| 3,185,815 | 5/1965 | Anderson | 219—121 |
| 3,232,114 | 2/1966 | Ferran | 73—398 |
| 3,340,377 | 9/1967 | Okazaki et al. | 219—121 |

RICHARD M. WOOD, Primary Examiner

W. DEXTER BROOKS, Assistant Examiner

U.S. Cl. X.R.

219—118